(12) United States Patent
Panten

(10) Patent No.: US 12,343,918 B2
(45) Date of Patent: Jul. 1, 2025

(54) METHOD FOR COATING A TEXTILE HOSE WITH A THERMOPLASTIC SEALING MATERIAL

(71) Applicant: KOB GmbH, Wolfstein (DE)

(72) Inventor: Andre Panten, Gronau (DE)

(73) Assignee: KOB GmbH, Wolfstein (DE)

( * ) Notice: Subject to any disclaimer, the term of this patent is extended or adjusted under 35 U.S.C. 154(b) by 47 days.

(21) Appl. No.: 18/275,506

(22) PCT Filed: Feb. 4, 2022

(86) PCT No.: PCT/EP2022/052656
§ 371 (c)(1),
(2) Date: Aug. 2, 2023

(87) PCT Pub. No.: WO2022/167557
PCT Pub. Date: Aug. 11, 2022

(65) Prior Publication Data
US 2024/0033986 A1    Feb. 1, 2024

(30) Foreign Application Priority Data
Feb. 4, 2021    (DE) .................... 10 2021 102 588.5

(51) Int. Cl.
*B29C 48/151*    (2019.01)
*B29C 48/00*    (2019.01)
(Continued)

(52) U.S. Cl.
CPC ........ *B29C 48/151* (2019.02); *B29C 48/0019* (2019.02); *B29C 48/10* (2019.02);
(Continued)

(58) Field of Classification Search
None
See application file for complete search history.

(56) References Cited

U.S. PATENT DOCUMENTS 3,418,404 A    12/1968    Hird
3,437,537 A  *  4/1969    Takada .................. F16L 11/085
                                                         156/244.14
(Continued)

FOREIGN PATENT DOCUMENTS

DE            2137059 A1    7/1972
DE       102013108760 A1    2/2015
(Continued)

*Primary Examiner* — Michael P. Rodriguez
(74) *Attorney, Agent, or Firm* — John Rizvi; John Rizvi, P.A.—The Patent Professor ®

(57)    ABSTRACT

The invention relates to a method for coating a textile hose (4) with a thermoplastic sealing material (5), in particular polyurethane-based, in a coating device (2). The textile hose (4) has a longitudinal direction and a circumferential direction and is manufactured continuously in the longitudinal direction and in the circumferential direction, in particular formed from a tubular knit hose; the textile hose (4) is fed to the coating device (2) and is continuously drawn onto a mandrel (6) extending in the longitudinal direction and approximately in the vertical direction (8) and is continuously transported further over this mandrel (6), the mandrel (6) being supported and oriented according to the position by at least one support means (10) provided outside the textile hose (4). The thermoplastic sealing material (5) is provided in a heated flowable state and is fed continuously to an entire outer circumference (38) of the textile hose (4) which is continuously transported over the mandrel (6) in such a way that some of the thermoplastic sealing material (5) can penetrate into the textile hose (4) and/or can adhere to the outer circumference (38) of the textile hose (4) and forms a closed superficial coating, and the textile hose (4) coated in this way is then continuously drawn off from the mandrel (6).

32 Claims, 2 Drawing Sheets

Figure 1:
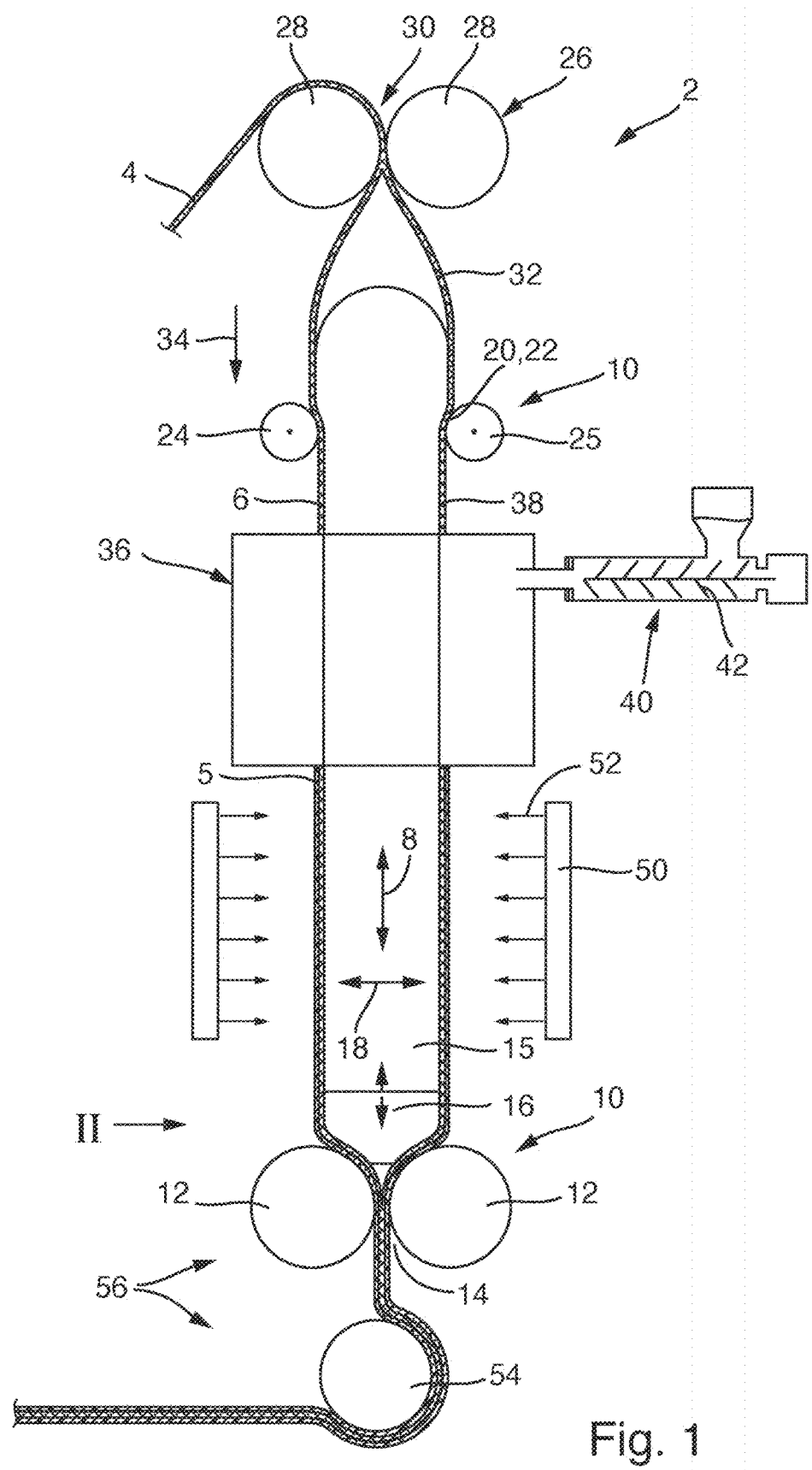

(51) Int. Cl.
*B29C 48/10* (2019.01)
*B29K 75/00* (2006.01)
*B29L 23/00* (2006.01)

(52) U.S. Cl.
CPC ...... *B29K 2075/00* (2013.01); *B29K 2913/02* (2013.01); *B29L 2023/005* (2013.01)

(56) References Cited

U.S. PATENT DOCUMENTS

| | | | | |
|---|---|---|---|---|
| 4,871,413 A | * | 10/1989 | Hyodo | B29C 48/34 156/244.14 |
| 5,322,664 A | * | 6/1994 | Blackwelder | B29C 55/26 425/72.1 |

FOREIGN PATENT DOCUMENTS

| | | |
|---|---|---|
| GB | 1081417 A | 8/1967 |
| WO | 2001058664 A1 | 8/2001 |

* cited by examiner

METHOD FOR COATING A TEXTILE HOSE WITH A THERMOPLASTIC SEALING MATERIAL

This application claims priority to German Patent Application No. 10 2021 102 588.5 filed on Feb. 4, 2021, the entire contents of which are incorporated herein by reference in their entireties.

The invention relates to a method for coating a textile hose with a thermoplastic sealing material, wherein the textile hose has a longitudinal direction and a circumferential direction and is manufactured continuously in the longitudinal direction and in the circumferential direction, in particular formed from a tubular knit hose.

Textile hoses coated with thermoplastic sealing material have been used for some time for inner pipe rehabilitation, in particular of sewer pipes and drainage pipes, but certainly also for other media-conducting piping. Typically, in this case either a flat material is coated and subsequently formed into a tubular shape or hose shape, which inevitably results in an interfering seam, or a round hose continuous in the circumferential direction is brought into a planar flat-folded shape and coated from both sides, wherein in this case an uncoated or poorly coated region along the respective fold line is formed.

Proceeding from this, the object of the present invention is to develop a method by means of which, in an economical and process-stable manner, a textile hose coated largely uniformly with a thermoplastic sealing material can be manufactured in a continuous method.

This object is achieved by a method according to the invention having the features of claim 1. The subject matter of the invention is therefore a method for coating a textile hose with a thermoplastic sealing material, in particular polyurethane-based, in a coating device, wherein the textile hose has a longitudinal direction and a circumferential direction and is manufactured continuously in the longitudinal direction and in the circumferential direction, in particular formed from a tubular knit hose, wherein the textile hose is fed to the coating device and is continuously drawn onto a mandrel extending in the longitudinal direction and approximately in the vertical direction and is continuously transported further over this mandrel, the mandrel being supported and oriented according to the position by at least one support means provided outside the textile hose, wherein the thermoplastic sealing material is provided in a heated flowable state and is fed continuously to an entire outer circumference of the textile hose which is continuously transported over the mandrel in such a way that some of the thermoplastic sealing material can penetrate into the textile hose and/or can adhere to the outer circumference of the textile hose and forms a closed superficial coating, wherein the textile hose coated in this way is then continuously drawn off from the mandrel.

It is therefore proposed according to the invention that the textile hose to be coated is not coated in a flattened state, but that it is fed to an elongated mandrel which is oriented in an approximately vertically manner in the coating device and is mounted in a floating manner under the interposition of the hose and is drawn onto this mandrel and is continuously transported further over this mandrel and is ultimately drawn off again from the mandrel, wherein this is carried out in a continuous method management and the textile hose is coated with the thermoplastic sealing material in the region of the mandrel. In this case, the mandrel and the hose surrounding it extend through a device for feeding melted thermoplastic sealing material to the outer circumference of the textile hose, and the endlessly fed textile hose is continuously guided through this device when carrying out the method and is thereby coated from the outside with the thermoplastic sealing material. In this case, a coating with a substantially uniform coating surface weight can also be realized in an advantageous manner, since, in particular, if the mandrel is formed with a substantially cylindrical outer shape, in the region of the application of the coating onto the textile hose, a sleeve-shaped layer of uniform thickness can readily be provided and applied. This is known from extrusion devices, in particular coextrusion devices, for manufacturing or coating rigid pipes.

It should be expedient for the majority of applications and prove to be advantageous if the textile hose coated in this way is drawn off from the mandrel and transferred into a storage form. In this case, it proves advantageous if the hose which is continuously drawn off from the mandrel is transferred again into a flattened folded form and is then, for example, rolled up in a roll form or bale form or cuttled in z-shaped manner, i.e., is laid down going back and forth in layers arranged one above the other. However, it can also prove advantageous if the coated textile hose is drawn off from the mandrel and is directly fed to further processing or further treatment.

For example, it could be introduced directly into a tubular body to be lined. In this case, it proves to be advantageous if the hose is introduced in the inverted state into the tubular body to be lined, so that its outer side coated with thermoplastic sealing material then forms the inside of the lined tubular body.

In order to be able to limit the longitudinal extension of the mandrel and the coating device, it proves to be advantageous if the textile hose coated in this way is cooled while still in the region of the mandrel. This can be carried out in an advantageous manner by means of air cooling which can be carried out, for example, by means of an air-permeable ring with air outlet openings. The cooling or the supplied cooling power or the length of the cooling section and thus also the length of the mandrel after the coating of the textile hose should advantageously be selected in such a way that the thermoplastic sealing material is cooled at least to such an extent that it is no longer plastically displaced or deformed in the region of a support of the mandrel or also in the region of a draw-off device acting on the textile hose. In this case, cooling to, for example, below 35° C. has proven to be advantageous.

It further proves to be advantageous, if the support means comprises at least one and preferably two support rollers which at least partially absorb a weight force of the mandrel.

Further, it proves advantageous if the support means comprises a pair of support rollers and if the mandrel is arranged and extended above the pair of support rollers so that it is supported on the pair of support rollers with a lower longitudinal end. In this way, the entire weight force or at least a large part of the weight force of the mandrel along with the textile hose surrounding it and the thermoplastic sealing material applied thereon can be absorbed. However, in addition or as an alternative to this, support means can be used which act in a supporting manner on the outer circumference of the mandrel. This will be explained below.

Furthermore, it may prove to be advantageous if the mandrel has an elongated mandrel body and, at its lower longitudinal end, a form support body by means of which the mandrel is supported on the support means, in particular wherein the form support body may be adjustable in the longitudinal direction with respect to the mandrel body. This form support body can be formed integrally with the rest of the mandrel body, or it can be attached to the mandrel body as a separate body therefrom. This proves to be advantageous because the form support body may be specifically designed to be complementary in accordance with a respective support means used in the device. It can also be formed from a material different from the mandrel body. It can also be replaced with a new form support body in the event of wear, provided that it is advantageously provided in such a manner that it can be detached from the mandrel body. If a length adjustability to the mandrel body is provided, for example by using a threaded spindle or by telescopic or other connecting means, a fine adjustment of the components of a coating device can be realized.

Furthermore, it proves to be advantageous if the form support body interacts with the support means in a complementary manner in such a way that the mandrel is not only supported vertically, but is additionally positionally stabilized in the lateral direction and/or in the circumferential direction of the mandrel.

In a further development of this thought, it proves to be advantageous if the form support body is formed regionally approximately complementary to a tapering roller gap in the case of a pair of support rollers, so that it can partially engage in the roller gap and is thereby positionally stabilized. As a result, the mandrel is thus prevented from rotating in the circumferential direction and is thus positionally stabilized. It is also placed so as to be non-displaceable transversely to the roller gap in the lateral, i.e., horizontal direction, and as a result, it is also positionally stabilized.

According to a further thought, it is proposed that the mandrel at its lower end or the form support body has at least one or preferably two rollers which are arranged parallel to one another and which, under the interposition of the coated textile hose, can roll against the support means for the mandrel, in particular against a pair of support rollers. As a result, the sliding off of the coated textile hose over the mandrel and thus also the drawing off of the coated textile hose can be designed with less resistance. This has the further advantage that tensile forces have to be introduced into the textile hose to a lesser extent.

According to a another particularly advantageous further development of the invention, it is proposed that the mandrel, in the longitudinal direction, has a change in cross-section between a lower and an upper longitudinal end so that a support collar is formed as a result, and that the mandrel is supported on the support collar by a support means provided outside the textile hose. As already mentioned at the outset, this support acting on the outer circumference of the mandrel can be effected in addition to or as an alternative to supporting the mandrel at its lower end. This support is preferably effected in a region of the mandrel which is arranged upstream of the coating of the textile hose. By means of such a particularly additional support on the outer circumference of the mandrel, centering of the floating mounting of the mandrel within the coating device can be realized. The support acting on the outer circumference of the mandrel can thus be effected in a centering manner and/or in a manner supporting in the vertical direction. Preferably, the support is both centering and supporting in the vertical direction, i.e., load-bearing.

In a further development of this thought, it proves to be advantageous for the support means to be formed by a pair of opposing support rollers, in particular by a first pair of support rollers and by a second pair of support rollers, which is arranged rotated by 90° with respect to the vertical direction relative to said first pair of support rollers. It proves to be particularly advantageous if at least some of these support rollers can be designed to be adjustable transversely to the longitudinal extension of the mandrel. This facilitates the insertion and removal of the mandrel from the device and also the initial pulling over of the textile hose over the mandrel. This also enables a fine adjustment in such a way that, according to the thickness of the textile hose, an optimal clearance can be set for an arrangement of the mandrel within the coating device, which is floating through the hose but is nevertheless positionally stabilized.

It may further prove to be advantageous if the support means comprises a ring element which forms a rounded and in particular concentric inlet for the mandrel and the hose. Thus, in particular, it can be designed to be funnel-shaped. This may be an alternative to the above-mentioned support means engaging the outer circumference of the mandrel. However, it may also prove to be advantageous that, in the region of a lower longitudinal end of the mandrel, instead of supporting rollers, such a ring element is used as a supporting means for the mandrel.

With regard to cost-effective storage and method management, it proves to be advantageous if the textile hose is provided and fed in a flattened state and is expanded within the coating device into a tunnel-shaped form and is drawn onto the mandrel.

It can also prove to be advantageous if a plurality of layers of thermoplastic sealing material are formed by coextrusion on the outer circumference of the textile hose which is transported continuously over the mandrel, wherein the plurality of layers are formed of different thermoplastic sealing materials in the sense that the plurality of layers differ with respect to at least one chemical or physical property. As a result, different properties of the plurality of layers can be realized through an appropriate choice of material. In particular, the plurality of layers differ with respect to at least one chemical or physical property, in particular with respect to their tackiness or adhesiveness of the or with respect to their tightness or stretchability or tensile strength or tear propagation resistance or wearability or elastic resilience or sliding or friction values.

Further, it proves to be advantageous if a thermoplastic polyester polyurethane (TPU), in particular with a Shore A hardness (determined according to DIN ISO 7613-1 3s) of at least 60 Shore A and at most 95 Shore A, in particular 80-95 Shore A, in particular 85-95 Shore A, in particular 90-93 Shore A, is used as the thermoplastic sealing material.

For example, a functional layer made of a hotmelt adhesive material can be used as an inner layer that comes into direct contact with the textile hose. This inner layer forms, to the textile hose, an adhesive force of the layer composite of at least 1200 cN/cm. This layer preferably has a thickness of 5-50 μm, in particular of 5-40 μm, in particular of 5-30 μm, in particular of 5-20 μm and more particularly of 5-15 μm.

It is further proposed that a layer adjoining it on the outside is provided, which decisively determines the primary requirements with regard to tightness and/or stretchability and/or tensile strength and/or tear propagation strength and/or wearability and/or elastic resilience of the coating. This typically middle layer preferably has a thickness of at least 50 μm, in particular of at least 70 μm, in particular of at least 80 μm and further preferably of at most 500 μm, in particular of at most 400 μm, in particular of at most 300 μm, in particular of at most 250 μm, in particular of at most 200 µm, in particular of at most 180 µm. It is preferably formed based on a thermoplastic polyester polyurethane (TPU).

Finally, it proves to be advantageous if an outer layer is provided, typically as a third layer and further typically based on a thermoplastic polyester polyurethane (TPU), which is formed with regard to setting optimal sliding and friction values. It then has a lower sliding and friction value than the layers adjoining it on the inside. Advantageously, it can be formed with a rather small wall thickness of preferably at least 30 µm, in particular at least 4 µm, in particular at least 5 µm, and further in particular at most 20 µm, in particular at most 15 µm, in particular at most 10 µm. A wall thickness of 4-6 µm has proven to be sufficient for this layer.

The total thickness of the coating, which, as explained above, can consist of a plurality of coextruded layers, can advantageously be at least 70 µm, in particular at least 80 µm, in particular at least 90 µm and further in particular at most 600 µm, in particular at most 500 µm, in particular at most 400 µm, in particular at most 300 µm, in particular at most 250 µm, in particular at most 200 µm, in particular at most 180 µm. With regard to low material costs, low wall thicknesses are preferred.

The subject matter of the invention is furthermore to provide a coating device for carrying out the method described above having the features of claim 16.

The coating device according to the invention can further comprise a device which is formed by the draw-off device or downstream of the draw-off device for transferring the coated textile hose into a storage form. A device for further treatment or further use of the coated hose could also be provided, in particular a device for introducing the coated textile hose into a tubular body to be lined.

If it is further proposed that a cooling device is provided for cooling the textile hose coated with thermoplastic sealing material, wherein the cooling device of the device for feeding melted thermoplastic sealing material is arranged downstream of the outer circumference of the textile hose.

The support means for supporting the mandrel surrounded by the hose to be coated in such a way that the mandrel is mounted in a sense to be floating within the hose which is continuously moved over it and is held in a positionally stabilized manner, it could preferably be designed in such a manner that the support means comprises at least one and preferably two support rollers which at least partially absorb a weight force of the mandrel.

Furthermore, it could be provided that the support means comprises a pair of support rollers and that the mandrel is arranged and extended above the pair of support rollers so that it is supported on the pair of support rollers with a lower longitudinal end.

In order to make it easier to draw the hose over the mandrel, it has proven to be advantageous if the mandrel has an elongated mandrel body and is formed in a manner tapered, and preferably rounded, at its upper end.

The mandrel preferably has a polished surface, in particular with a roughness of at most 0.3 Ra/µm, which can be determined, for example, according to DIN EN ISO 4287: 1998.

It is also conceivable and advantageous for the mandrel to have a friction-reducing coating on its surface.

According to a further embodiment, it is provided that the mandrel has an elongate mandrel body and a form support body on its lower longitudinal end, by means of which the mandrel can be supported on the support means, in particular wherein the form support body can be adjustable in the longitudinal direction with respect to the mandrel body. The form support body can in particular be formed integrally with the mandrel.

It has proven to be advantageous if the form support body is detachable from the elongate mandrel body, i.e., can be replaced when worn.

In a further embodiment, it may be provided that the form support body has at least one or preferably two rollers which are arranged parallel to one another and which, under the interposition of the coated textile hose, can roll against the support means for the mandrel, in particular against a pair of support rollers.

It proves to be particularly advantageous if the mandrel, in the longitudinal direction, has a cross-sectional change between a lower and an upper longitudinal end so that a support collar is formed as a result, and that the mandrel can be supported on the support collar by a support means provided outside the textile hose. In this case, the support means can exert both a supporting centering function in a horizontal plane and additionally or alternatively a supporting function in the vertical direction.

The aforementioned support means may also be formed by a pair of opposing support rollers, in particular by a first pair of support rollers and by a second pair of support rollers which is formed offset by 90° with respect to said first pair of support rollers.

According to a further embodiment of the coating device, it can prove to be advantageous that the support means is formed by a ring element which forms a rounded and concentric inlet for the mandrel and the hose.

It proves to be advantageous that the feeding and transporting device is designed such that it feeds the textile hose in a flattened state in the direction of the mandrel and transports it further over the mandrel in the expanded state.

Furthermore, it proves to be advantageous that the device for feeding melted thermoplastic sealing material to the outer circumference of the textile tube is designed such that, by coextrusion, a plurality of layers of thermoplastic sealing material is formed on the outer circumference of the textile hose, wherein the plurality of layers is formed in particular from different thermoplastic sealing materials.

Further features, details and advantages of the invention are apparent from the appended claims and from the graphical representation and the following description of a preferred embodiment of the method according to the invention and the coating device according to the invention.

Figure 2:
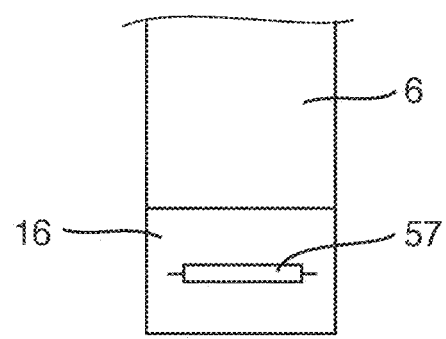
Figure 3:
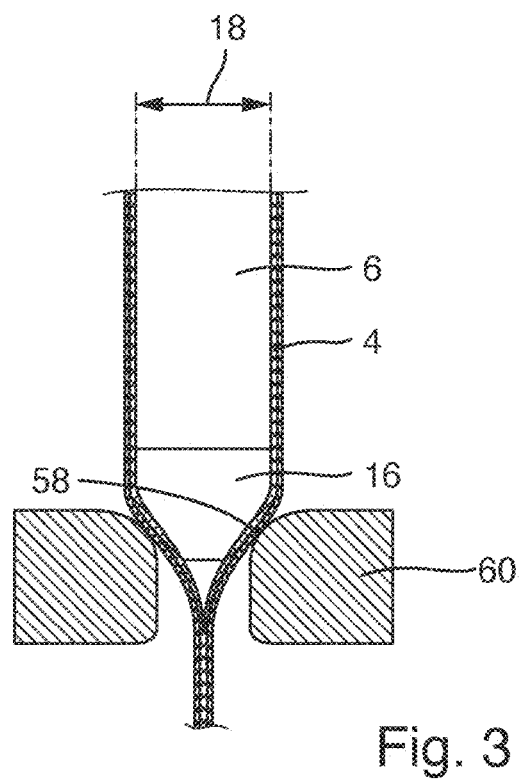

In the drawings:

FIG. 1 is a schematic representation of essential components of an embodiment of the coating device according to the invention and a textile hose continuously conveyed through the coating device;

FIG. 2 is a schematic representation of another embodiment of a lower end region of a mandrel; and FIG. 3 is a schematic representation of the support of the mandrel by means of an annular support element in another embodiment FIG. 1 schematically illustrates some essential components of a coating device according to the invention, designated overall by the reference numeral 2, for coating an endless and continuously fed textile hose 4 with a thermoplastic sealing material 5, the thickness of which is not shown to scale in the figures but shown with exaggerated thickness for better perception. The most essential element of the coating device 2 according to the invention is formed by an elongated rod-shaped mandrel 6, onto which the hose 4 is continuously drawn and moved over the mandrel and finally drawn off the mandrel again. The textile hose 4 has a longitudinal direction and a circumferential direction and is manufactured continuously in the longitudinal direction and in the circumferential direction, in particular formed as a tubular knit hose. In the region of the mandrel 6, the longitudinal direction and the circumferential direction of the hose 4 correspond to a longitudinal direction and a circumferential direction of the mandrel 6.

The rod-shaped mandrel 6 extends and is aligned approximately in the vertical direction 8 while at the same time being positionally stabilized. In this case, the mandrel is supported by a plurality of support means, each of which is supported under the interposition of the textile hose surrounding it.

A support means 10 is arranged below the mandrel 6. It is formed by two support rollers 12 which delimit between them a roller gap 14 through which the hose is guided and drawn off the mandrel.

The mandrel 6 comprises an elongated rod-shaped mandrel body 15 and a form support body 16 attached to the elongated mandrel body 15 at its lower end, which is preferably detachable and preferably adjustable in the longitudinal direction of the mandrel. The adjustability is indicated by a dashed arrow. The form support body 16 forms a tapering lower end of the mandrel 6 and, for this purpose, is formed approximately complementary to the roll gap 14 formed by the support rollers 12, at least in certain areas. In this way, a positionally stabilized arrangement and support of the mandrel 6 can be achieved on the support means 10 formed by the support rollers 12. The mandrel 6 is thus not only supported in the vertical direction 6, but also positionally stabilized in the horizontal direction 18.

Furthermore, the rod-shaped mandrel 6 has a cross-sectional change 20 further above in such a way that its diameter and cross-section widen somewhat towards the top so that a support collar 22 which is formed in a rounded manner is thereby formed by this cross-sectional change 20. In the region of this support collar 22, another pair of support rollers 24 is provided on opposite sides of the mandrel in the horizontal direction 18. At least one support roller 24 can be adjusted preferably in the horizontal direction 18 so that a fine adjustment and thus a further positional orientation of the mandrel 6 can be achieved. However, the two support rollers 24 can also perform a support function acting in the vertical direction 8 during the mounting or also floating mounting of the mandrel 6 by also supporting the mandrel 6 in the vertical direction in the region of the support collar 22. For this purpose, it proves to be advantageous if the rounded support collar 22 and the support rollers 24 have at least approximately and in sections a comparable curvature, so that support can be provided over as large an area as possible.

This also facilitates the continuous further transporting of the textile hose 4 over the mandrel 6, i.e., between the mandrel 6 and the support rollers 24. It would also be conceivable for another pair of support rollers to be arranged offset by 90° about the vertical direction 18 and rest against the mandrel; these would then be behind or in front of the drawing plane of the figure.

For feeding, transporting and removing the textile hose which is endless and in the circumferential direction 4 continuous, which is formed in particular by a tubular knit hose, a feeding and transporting device 26 is indicated schematically by two drive rollers 28 which roll against one another and in turn form a roller gap 30 between them. As can be seen schematically from the figure, the textile hose 4 can be fed to the coating device 2 in a flattened state with lateral folding edges. It is fed to the roller gap 30 and thereby transported through the support rollers 24. Downstream of the drive rollers 28, the textile hose 4 is then guided onto and over the mandrel 6 and is thereby brought to its substantially cylindrical shape. Here, it has proven to be advantageous for the mandrel 6 to have a tapering but rounded upper end 32. The outer diameter of the mandrel and the diameter of the textile hose 4 are preferably to be matched to one another in such a way that the hose 4 does not form longitudinal folds when it is drawn onto, but that it is not stretched either, so that it does not contract again and form folds when it is subsequently drawn off the mandrel 6. Thus, the outer diameter of the mandrel and the natural unstretched inner diameter of the textile hose 4 essentially correspond to one another.

In the vertical direction 8 below the upper support rollers 24, i.e., downstream of the upper support rollers 24 in a transport direction 34 of the textile hose 4, a device 36 for feeding melted thermoplastic sealing material 5 to an outer circumference 38 of the textile hose 4 is provided and schematically indicated in the figure. This device 36 forms a through opening extending in the vertical direction 8, through which the mandrel 6 with the textile tube 4 continuously transported over it extends through. The device 36 interacts with a device 40 for melting and providing a flowable and thus extrudable thermoplastic sealing material 5 under an extrusion pressure, wherein a screw conveyor device 42 is schematically indicated at this device 40.

Thus, the device 36 for feeding melted thermoplastic sealing material 5 to the outer circumference 38 of the textile hose 4 is a tool designed to feed the melted thermoplastic material fed by the device 40 and under extrusion pressure as uniformly as possible to the outer circumference 38 of the hose 4. For this purpose, so-called circular distributors can be used with the device 36, which are designed to distribute an extrudable thermoplastic material around an outer circumference to be coated of a quill in a substantially uniform manner, wherein the mandrel 6 with the textile hose drawn over it acts as a quill of such an extrusion tool and is coated. It is also conceivable that the device 36 for feeding melted thermoplastic sealing material to the outer circumference of the textile hose is formed as a coextrusion tool so that not only a single layer of thermoplastic sealing material but a plurality of such layers can be formed concentrically one above the other. For this purpose, several devices 40 for melting and feeding thermoplastic sealing material preferably in the circumferential direction about the mandrel 6 are then arranged offset from one another so that they can each be connected radially inwards with the device 36 for feeding melted thermoplastic sealing material.

When guiding through the endless and continuously transported textile hose 4 through the device 36, a single- or multi-layer extruded or co-extruded layer of thermoplastic sealing material 5 with preferably substantially uniform coating surface weight is applied to the outer circumference 38 of the textile hose 4, so that the textile hose 4 exiting the device 36 has this layer of then possibly still flowable thermoplastic sealing material 5. In order to stabilize this layer of thermoplastic sealing material, a schematically indicated cooling device 50 is provided downstream of the device 36 in the transport direction 34, which cooling device preferably concentrically surrounds the mandrel 6 and acts upon it with cooling air 52 flowing radially inwards, so that the thermoplastic sealing material 5 is cooled to temperatures of preferably below 35° C. and in any case below a softening temperature of the thermoplastic sealing material when it exits the region of the cooling device 50.

The support rollers 12 mentioned at the outset and a further draw-off roller 54 form a draw-off device 56 for drawing off the coated textile hose 4. After the draw-off device 56 or by means of the draw-off device 56, the coated textile hose 4 can be transferred into a storage form. For this purpose, it can in particular be rolled up or wound into a roll or bale form. However, it would also be conceivable for further processing or treatment of the coated textile hose 4 to be carried out downstream of the draw-off device 56, in particular the coated textile hose 4 could be inserted directly into a pipe to be lined internally.

FIG. 2 illustrates a further embodiment according to which at the lower end of the mandrel 6 or, in the case shown here, in the case of the form support body 16 attached from below, in particular two preferably needle-mounted rollers 57 on opposite sides of the form support body 16 are provided, which, under the interposition of the coated textile hose 4, roll against the respective support roller 12. As a result, the resistance when the coated hose 4 is drawn off can be further reduced. Figure two views mandrel 6 in the direction of arrow II in FIG. 1, wherein the textile hose 4 and the support rollers 12 are omitted.

FIG. 3 schematically shows an embodiment in which, in the region of the lower end of the mandrel 6, instead of the support rollers 12 shown in FIG. 1, a ring element 60 formed with a rounded inner surface 58 is provided as a support means 10 for the mandrel 6. This ring element 60 forms a funnel, so to speak, on the inner wall or inner surface 58 of which the mandrel 6 is supported and at the same time is positionally stabilized in the horizontal direction 18 towards all sides. As in the first embodiment, the coated textile hose 4 is interposed between the mandrel 6 and the ring element 60, i.e., guided through between the mandrel 6 and the ring element 60. Thus, it extends through the ring element 60 and, as in the embodiment according to FIG. 1, is drawn off from the lower end of the mandrel 6. Here, it proves to be advantageous if the lower end of the mandrel 6 or of the form support body 16 and the inner surface 58 of the ring element 60 are formed at least in sections with a corresponding curvature or complementary to one another, so that a flat abutment and support of the mandrel 6 can be achieved, so that the resistance when drawing through the coated textile hose 4 can be kept as low as possible. As already mentioned at the outset, such a support element in the form of a ring element 60 could also be provided for supporting the mandrel 6 at its outer circumference further above, in particular in the region of a support collar, in particular as an alternative to the support rollers 24 of the embodiment example according to FIG. 1 engaging at the outer circumference 38 and in particular in addition to a support at the lower end of the mandrel 6.

With the present invention, it is not only possible to manufacture a textile hose more cost-effectively, in particular for the intended use for the inner lining of pipes, but it is also possible to achieve an improvement in quality with regard to the uniformity of the coating with the thermoplastic sealing material.

The invention claimed is:

1. A method for coating a textile hose (4) with a thermoplastic sealing material (5), in a coating device (2), wherein the textile hose (4) has a longitudinal direction and a circumferential direction and is manufactured continuously in the longitudinal direction and in the circumferential direction, and,
    wherein the method comprises:
    feeding textile hose (4) to the coating device (2);
    drawing the textile hose (4) in a transport direction (34) onto a mandrel (6) extending in the longitudinal direction and approximately in the vertical direction (8);
    transporting the textile hose (4) further in the transport direction (34) over the mandrel (6), wherein the mandrel (6) is supported and oriented by at least one support means (10) provided outside the textile hose (4),
    providing thermoplastic sealing material (5) in a heated flowable state;
    feeding the thermoplastic sealing material to an outer circumference (38) of the textile hose (4) which is transported over the mandrel (6) in such that some of the thermoplastic sealing material (5) is capable of penetrating into the textile hose (4) and/or is capable of adhering to the outer circumference (38) of the textile hose (4) and forms a closed superficial coating thereon; and,
    drawing the coated textile hose (4) in the transport direction (34) and over a support body (16) of the mandrel (6) and from the mandrel (6);
    wherein the support means (10) comprises a pair of support rollers (12), and the mandrel (6) is arranged to extend above the pair of support rollers (12), the pair of support rollers (12) configured and dimensioned to operatively engage the support body (16) of the mandrel (6) to absorb a weight force of the mandrel (6) to at least partially support the mandrel (6) in the longitudinal direction and/or a vertical direction within the coating device (2); and
    wherein the support body (16) defines a tapered or curved surface and terminates within a complementary curved or tapered gap (14) defined between the support rollers (12); and
    wherein the tapered or curved surface of the support body (16) and the complementary curved or tapered gap (14) of the support rollers (12) are configured to transition the coated textile hose (4) to a flattened state for storage.

2. The method of claim 1, further comprising transferring the coated textile hose (4) into a storage form, or the coated textile hose (4) is directly fed to further treatment or further use.

3. The method of claim 1 further comprising cooling the coated textile hose (4) while still in the region of the mandrel (6).

4. The method of claim 1, wherein the support body (16) interacts with the support means (10) in a complementary manner in such a way that the mandrel (6) is positionally stabilized in a lateral direction and/or in a circumferential direction.

5. The method of claim 1 wherein the mandrel (6) at its lower end or the support body (16) has at least one roller (57) which, under the interposition of the coated textile hose (4), is capable of rolling against the support means (10) for the mandrel (6).

6. The method of claim 1 wherein the mandrel (6), in the longitudinal direction, has a cross-sectional change (20) between a lower and an upper longitudinal end so that a support collar (22) is formed as a result, and in that the mandrel (6) is supported on the support collar (22) by a support means (10) provided outside the textile hose (4).

7. The method of claim 6, wherein the support means (10) includes a pair of opposing support rollers (24) having a first pair of support rollers (24) and a second pair of support rollers (24) which is arranged offset by 90° with respect to the first pair of support rollers (24).

8. The method of claim 1, wherein the support means (10) comprises a ring element (60) which forms a rounded, inlet for the mandrel (6) and the hose (4).

9. The method of claim 1 wherein the feeding of the textile hose (4) is provided in a flattened state and is expanded within the coating device (2) into a tunnel-shaped form prior to being drawn onto the mandrel (6).

10. The method of claim 1 wherein the feeding of the thermoplastic sealing material further comprises feeding a plurality of layers of thermoplastic sealing materials, which layers are formed by coextrusion on the outer circumference (38) of the textile hose (4) which is transported continuously over the mandrel (6), and wherein the plurality of layers are formed of different thermoplastic sealing materials which differ with respect to at least one chemical or physical property.

11. The method of claim 1, wherein the thermoplastic sealing material is a thermoplastic polyester polyurethane (TPU).

12. A coating device (2) for carrying out the method of claim 1, comprising:
an elongated rod-shaped mandrel (6) and a support means (10) for supporting the mandrel (6) in a substantially vertical direction (8), wherein the mandrel (6) is located within the textile hose (4),
a feeding and transporting device (26) for feeding the textile hose (4) to the mandrel (6) and for continuously transporting the hose over the mandrel,
a device (36) for feeding melted thermoplastic sealing material (5) to the outer circumference (38) of the textile hose (4) in such a manner that the hose (4) is coated with substantially uniform coating surface weight, wherein the mandrel (6) extends, with the hose (4) which is continuously transported over the mandrel (6), through said means (36), a draw-off device (56) for drawing off the coated textile hose (4);
wherein the support means (10) comprises a pair of support rollers (12), and the mandrel (6) is arranged to extend above the pair of support rollers (12), the pair of support rollers (12) configured and dimensioned to operatively engage a support body (16) of the mandrel (6) to absorb a weight force of the mandrel (6) to at least partially support the mandrel (6) in the longitudinal direction and/or a vertical direction within the coating device (2);
wherein the support body (16) defines a tapered or curved surface and terminates within a complementary curved or tapered gap (14) defined between the support rollers (12); and
wherein the tapered or curved surface of the support body (16) and the complementary curved or tapered gap (14) of the support rollers (12) are configured to transition the coated textile hose (4) to a flattened state for storage.

13. The coating device (2) of claim 12, further comprising a device for transferring the coated textile hose into a storage form, or a device for directly introducing the coated textile hose into a tubular body to be lined.

14. The coating device (2) according to claim 12 further comprising a cooling device (50), for cooling the textile hose (4) coated with thermoplastic sealing material (5), wherein the cooling device (50) is arranged downstream of device (36) for feeding melted thermoplastic sealing material (5) to the outer circumference (38) of the textile hose (4).

15. The coating device (2) of claim 12, wherein the mandrel (6) has an elongated mandrel body (15) and is formed in a manner tapered, at its upper end (32).

16. The coating device (2) of claim 12, wherein the mandrel (6) has a polished surface.

17. The coating device (2) of claim 12 wherein the mandrel (6) has a friction-reducing coating on its surface.

18. The coating device (2) of claim 12 wherein the mandrel (6) has an elongated mandrel body (15) and the support body (16) which is coupled to the mandrel body (15).

19. The coating device of claim 18 wherein the support body (16) has at least one roller (57) which, under interposition of the coated textile hose (4), can roll against the support means (10) for the mandrel (6).

20. The coating device of claim 12 wherein the mandrel (6), in the longitudinal direction, has a cross-sectional change (20) between a lower and an upper longitudinal end so that a support collar (22) is formed as a result, and in that the mandrel (6) can be supported on the support collar (22) by a support means (10) provided outside the textile hose (4).

21. The coating device of claim 20, wherein the support means (10) includes a pair of opposing support rollers (12, 24).

22. The coating device of claim 12, wherein the support means (10) include a ring element (60) which forms a rounded inlet for the mandrel (6) and the hose (4).

23. The coating device of claim 12, wherein the feeding and transporting device (26) is designed such that it feeds the textile hose (4) in a flattened state in the direction of the mandrel (6) and transports it further over the mandrel (6) in the expanded state.

24. The coating device of claim 12, wherein the device (36) for feeding melted thermoplastic sealing material (5) to the outer circumference (38) of the textile hose (4) is designed to form by coextrusion a plurality of layers of thermoplastic sealing material (5) on the outer circumference (38) of the textile hose (40).

25. The method of claim 6 wherein the support means (10) includes a pair of opposing support rollers (24) operatively engageable with the support collar (22) to support the mandrel (6) in the vertical and/or longitudinal direction, wherein, during transporting the textile hose (4), the textile hose (4) is disposed between the pair of opposing support rollers (24) and the mandrel (6) in contacting engagement with the support collar (22).

26. A method for coating a textile hose (4), the textile hose (4) having a longitudinal direction and a circumferential direction, comprising:
feeding a textile hose (4) to a coating device (2);
drawing the textile hose (4) onto a mandrel (6);
supporting the mandrel (6) within the coating device (2) in floating relation with one or more support members (12, 60), the one or more support members (12, 60) disposed external to the textile hose (4) and operatively engageable with a support surface of the mandrel (6) to support a weight force of the mandrel (6) to maintain a vertical position of the mandrel (6) within the coating device (2) and to center the mandrel (6) within the coating device (2) and relative to the textile hose (4);
transporting the textile hose (4) over the mandrel (6);
applying thermoplastic sealing material (5) in a heated flowable state onto the textile hose (4) to coat the textile hose (4); and
drawing the coated textile hose (4) off the mandrel (6) such that the coated textile hose (4) passes between a tapered or curved surface of the mandrel (6) and a complementary curved or tapered surface of the one or more support members (12, 60), to transition the textile hose (4) from a cylindrical or tubular state to a flattened state for storage.

27. The method of claim 26 wherein supporting the mandrel (6) includes:
   a) operatively engaging a first pair of support rollers (24) with an upper end of the mandrel (6); and
   b) operatively engaging a second pair of support rollers (12) with a lower end of the mandrel (6).

28. The method of claim 27 wherein the mandrel (6) defines a collar (22), and wherein operatively engaging a first pair of support rollers (24) includes operatively engaging the first pair of support rollers (24) with the collar (22) and wherein, during transporting the textile hose (4), the textile hose (4) is disposed between the first pair of rollers (24) and the mandrel (6) and in contacting engagement with the support collar (22).

29. The method of claim 27 wherein the mandrel (6) includes a mandrel body (15) and a support body (16) coupled to the mandrel body (15), and wherein operatively engaging a second pair of support rollers (12) with a lower end of the mandrel (6) includes operatively engaging the second pair of support rollers (12) with the support body (16).

30. The method of claim 29 wherein the support body (16) is adjustable relative to the mandrel body (15), and further including adjusting the vertical or longitudinal position of the support body (16) relative to the mandrel body (15).

31. The method of claim 29 wherein the support body (16) defines the tapered or curved surface and the second pair of support rollers (12) defines the complementary curved or tapered surface, and wherein the support body (12) terminates within a gap between the second pair of support rollers (12).

32. The method of claim 26 wherein supporting the mandrel (6) includes:
   operatively engaging a ring element (60) with a lower end of the mandrel (6), the ring element (60) defining the complementary curved or tapered surface.

* * * * *